C. S. EATON.
BELT FASTENER.
APPLICATION FILED SEPT. 19, 1906.
940,443.
Patented Nov. 16, 1909.
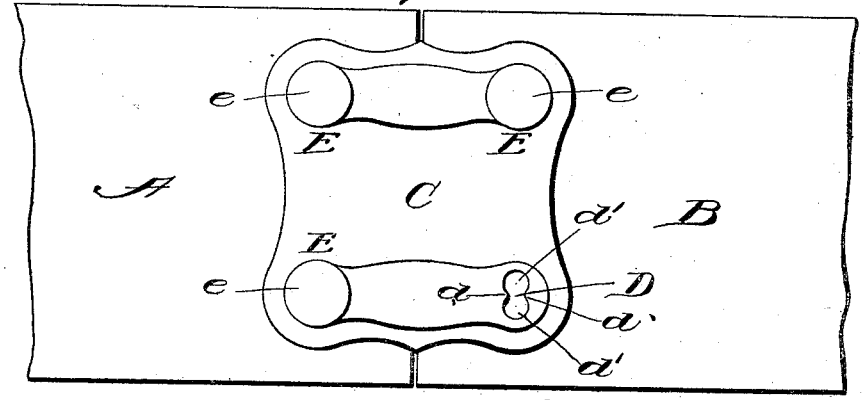
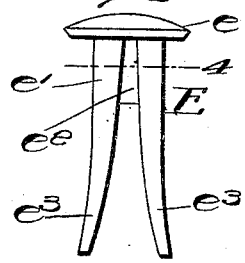
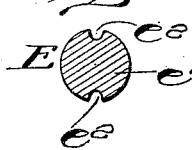
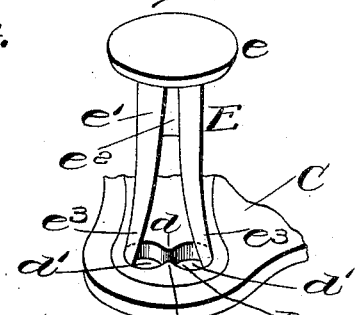
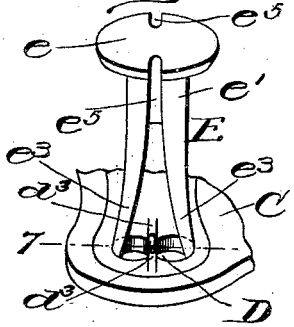
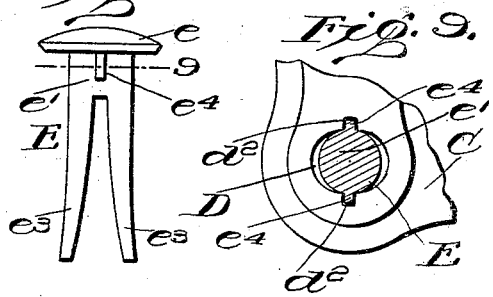
WITNESSES:
Allan H. Food.
J. Richards
INVENTOR
C. S. Eaton
BY
Wm. A. Megrath
ATTORNEY

UNITED STATES PATENT OFFICE.

CLARA S. EATON, OF NEW YORK, N. Y.

BELT-FASTENER.

940,443.     Specification of Letters Patent.     Patented Nov. 16, 1909.

Application filed September 19, 1906. Serial No. 335,175.

*To all whom it may concern:*

Be it known that I, CLARA S. EATON, a citizen of the United States, and a resident of the city, county, and State of New York, have invented certain new and useful Improvements in Belt-Fasteners, of which the following is a specification.

My invention relates to belt fasteners of that class in which a plate is placed across the abutting ends of the belt, said plate being provided with openings through which rivets extend, said rivets passing through the belt and turned over and clenched under the under side to secure the plate and the ends of the belt together.

One of the principal objects of the invention is to provide a belt fastener of the kind stated in which the openings in the plate, and the rivets, are of such relative formation that the rivet will enter the plate and pass through the belt in a predetermined position only, and will be held against axial movement in the openings and the said rivets are especially adapted to be used with the plates provided therefor.

Other objects will appear from the hereinafter description.

The novel features of the invention will be understood by reference to the following description taken in connection with the accompanying drawing which is made a part of this application, and to the claims at the end of the specification.

Referring to the drawing in which the same reference character indicates the same part in the several views, Figure 1 is a plan showing the two ends of a belt connected with each other by my improved fastening means, one of the rivets being omitted to show the preferred form of opening in the plate. Fig. 2 is an edge or side view of Fig. 1. Fig. 3 is a detail view of the preferred form of rivet and is the one intended to be used in connection with the plate shown by Fig. 1. Fig. 4 is a cross section of the rivet on line 4 of Fig. 3. Fig. 5 is a perspective view of one corner of the plate shown in Fig. 1, with the ends of the prongs of the rivet inserted in the opening preparatory to being driven in place. Fig. 6 is a perspective view of a slightly modified form of plate and rivet which I may also use. Fig. 7 is a cross section of such a plate on line 7 of Fig. 6. Fig. 8 is a side elevation of another modification of rivet. Fig. 9 is a cross section of said rivet on line 9 of Fig. 8, and a view of the opening in the plate adapted for such rivet.

The parts marked A and B on the drawing represent the two ends of the belt and C the plate which is riveted thereto to connect the said ends together.

I do not limit myself in the present application to any particular detailed construction of the body of the plate, but it is preferably made with upturned edges $c$ to lessen the liability of the belt being cut, and with concave under sides $c'$ whereby it conforms to the periphery of the pulley or wheels over which the belt runs.

It is desirable that the prongs of the rivet be made to lie transversely of the belt so that both the prongs can take up the strain. In order to insure the prongs being inserted in the belt in this direction, I so form the openings in the plate and projections or recesses on the rivets as to secure said result when the rivet is inserted in the opening in the plate.

Referring to the construction shown in Figs. 1, 2, 3, 4 and 5 of the drawing, it will be seen that the openings D are not circular as such openings have heretofore been made, but each has a major axis transverse of the belt. The inner surfaces of these openings are of irregular shape being formed with inward projections $d$ which reduce the diameter of the openings and divide the openings into two portions or branches $d'$ $d'$ each adapted to receive one of the prongs of a double pronged rivet E.

The rivet E which I have used for this form of opening has a head $e$ and a shank having a neck $e'$ formed with grooves $e^2$ on opposite sides thereof. The shank is divided at its lower part to form the two prongs $e^3$ $e^3$. This rivet can only be inserted into the opening in one position; that is to say, it must be turned so that its prongs $e^3$ $e^3$ will enter the respective branches $d'$, and its grooves $e^2$ will register with or receive the projections $d$ of said opening D.

In Figs. 6 and 7 I have shown a construction similar to that shown in the prior figures, but I have modified the same somewhat in that I have extended the grooves $e^2$ through the head of the rivet, and I have not only extended the projections $d$ inwardly, but I have also extended them upwardly above the upper surface of the plate C so that said raised parts will enter those parts of the grooves $e^5$ extending through the head of the rivet. I have shown in said figures two projections $d^3$ and a similar number of corresponding grooves $e^2$ in the shank of the rivet. It is apparent, however, that only one projection and one groove may be used.

While I have shown the projections in the openings in the plate and the grooves in the shank of the rivet, it is apparent that the relative location of these parts may be reversed. Namely, by providing the shanks of the rivets with projections or fins and the plate with grooves in the openings into which the rivets fit. In Figs. 8 and 9 I have shown this relative location of the parts, the projections on the rivets being marked $e^4$ and the recesses in the plate being marked $d^2$ respectively. As shown, the prongs of the rivet are open so that the ends thereof bear against the inner walls of the openings in the plate with sufficient pressure to hold them in position until driven into the belt. This does away with the necessity of employing a holding tool on the head of the rivet as has heretofore been done. While this is the preferable construction, yet it is to be understood that in all forms of my rivet the prongs are not so separated. They may be substantially parallel to each other and of less size in cross section than the cross section of the opening in the plate so that a holder will be necessary to hold the rivet up while being driven, but even in this form, the rivet can be driven home in only one direction, being so guided by the groove and recess in the rivet or in the openings in the plate.

The rivet here described is easily produced, and the groove $e^2$ or the fin $e^4$ may be placed thereon during the operation of making the rivet, preferably by swaging.

Having now described my invention, what I claim as new and desire to secure by Letters Patent is:

1. In a belt fastener, a plate having an opening therein, a rivet having prongs adapted to be inserted therein, one of said elements provided with a groove and the other with a projection to fit said groove.

2. In a belt fastener of the class described, a plate having an opening therein adapted to receive a rivet and provided with a guide by which to position said rivet, and a rivet having prongs and also provided with a guide to co-act with the first mentioned guide, said guides being so located that the prongs of the rivet must lie in a predetermined relation with respect to the plate.

3. In a belt fastener of the class described, a plate having an opening therein, said opening having irregularities on its wall, and a rivet having prongs and provided with corresponding irregularities adapted to mate with the irregularities in said opening and to be guided thereby, the said irregularities being so located as to cause the prongs of the rivet to lie in a predetermined relation with respect to the plate.

4. In a belt fastener, a plate having an opening, the wall of which is provided with one or more projections, and a rivet having prongs and provided with one or more grooves to receive said projections, the projections and grooves being so located that the prongs of the rivet must lie in a predetermined relation with respect to the plate.

5. In a belt fastener of the class described, a plate having an opening adapted to receive a rivet and provided at opposite sides of said opening with guides by which to position said rivet therein, and a rivet adapted to said opening and provided with diverging elastic free extremities adapted to bind against the wall thereof.

6. In a belt fastener of the class described, a plate having an opening adapted to receive a rivet and provided with guides, a rivet adapted to said opening and also provided with guides which meet with the guides in the plate, said rivet being also provided with diverging free extremities adapted to bind against the walls of said opening.

7. In a belt fastener of the class described, a plate having an opening the wall of which is formed with one or more projections, and a rivet adapted to said opening and provided with one or more grooves to receive the projections and having its prongs formed with diverging free extremities adapted to coöperate with the wall of the opening to hold the rivet in position to be driven.

8. A rivet for belt fasteners, having its shank provided with a groove or grooves and with prongs below said groove or grooves, the said groove or grooves being for the purpose set forth.

9. In a belt fastener of the class described, a plate having an opening therein and a bifurcated rivet adapted to be inserted therein, one of said elements provided with a groove and the other with a projection to fit said groove, said groove and projection being so located that the prongs of the rivet must lie in predetermined relation in reference to the plate.

In witness whereof I have hereunto set my hand at the city, county and State of New York, this eighteenth day of September, 1906.

CLARA S. EATON.

In presence of—
ALLAN W. FOOSE,
JOHN J. RANAGAN.